(12) United States Patent
Kuenen

(10) Patent No.: US 7,418,920 B2
(45) Date of Patent: Sep. 2, 2008

(54) DEVICE FOR COATING FOOD PRODUCTS WITH A PARTICULATE MATERIAL

(75) Inventor: Hendrikus Antonius Jacobus Kuenen, Overloon (NL)

(73) Assignee: CFS Bakel B.V., En Bakel (NL)

( * ) Notice: Subject to any disclaimer, the term of this patent is extended or adjusted under 35 U.S.C. 154(b) by 166 days.

(21) Appl. No.: 11/271,201

(22) Filed: Nov. 10, 2005

(65) Prior Publication Data

US 2006/0107893 A1    May 25, 2006

(30) Foreign Application Priority Data

Nov. 19, 2004   (NL) ................................. 1027554

(51) Int. Cl.
    *B05C 3/08*    (2006.01)
(52) U.S. Cl. .............................. 118/13; 118/19; 118/30; 118/303; 118/322; 118/324; 99/494
(58) Field of Classification Search .................. 118/13, 118/19, 30, 303, 322, 324; 99/494; 426/295; 209/247, 284, 289
    See application file for complete search history.

(56) References Cited

U.S. PATENT DOCUMENTS

| | | | |
|---|---|---|---|
| 1,419,131 A | 6/1922 | Foster | |
| 3,097,967 A | 7/1963 | Fries et al. | |
| 3,102,052 A | 8/1963 | Ackles | |
| 3,304,732 A * | 2/1967 | Rubin | ............................ 62/63 |
| 3,446,030 A * | 5/1969 | Rubin | ............................ 62/63 |
| 3,595,680 A | 7/1971 | Fischer et al. | |
| 4,123,213 A | 10/1978 | Laramore | |
| 6,158,332 A | 12/2000 | Nothum, Sr. et al. | |
| 6,588,363 B1 * | 7/2003 | Burke et al. | .................. 118/13 |

FOREIGN PATENT DOCUMENTS

| EP | 0 462 309 A1 | 12/1991 |
|---|---|---|
| GB | 898188 | 6/1962 |

* cited by examiner

*Primary Examiner*—Laura Edwards
(74) *Attorney, Agent, or Firm*—The Webb Law Firm

(57) ABSTRACT

A device for coating a food product with a particulate coating material comprises at least one essentially horizontal, rotary drum, at least one feed line for feeding food products to be coated to one end of the drum, at least one removal line for removing coated food products at the opposite end of the drum, as well as feed means for feeding the coating material to the food products, such that when the drum rotates the food products are tumbled and move from the end of the drum that is oriented towards the feed line to the opposite end. At least one further rotary drum is provided, the width of the feed line and the removal line being greater than the diameter of a drum and said lines extending over at least two drums in the transverse direction.

11 Claims, 3 Drawing Sheets

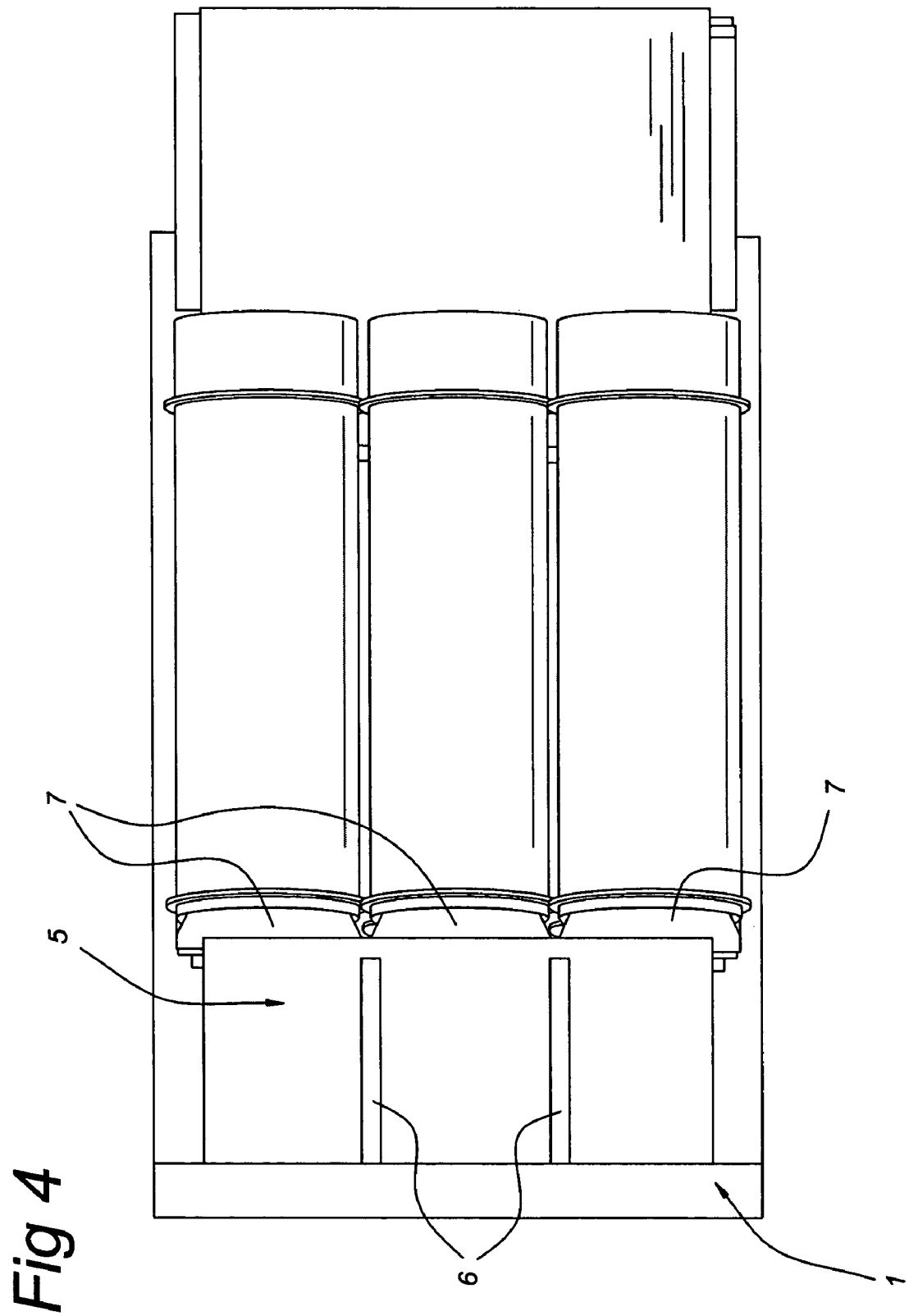

DEVICE FOR COATING FOOD PRODUCTS WITH A PARTICULATE MATERIAL

The invention relates to a device for coating a food product with a particulate coating material comprising at least one essentially horizontal, rotary drum, one feed line for feeding food products to be coated to one end of the drum, one removal line for removing coated food products at the opposite end of the drum, as well as feed means for feeding the coating material to the food products in the drum, such that when the drum rotates the food products are tumbled and move from the end of the drum that is oriented towards the feed line to the opposite end.

Such a device is disclosed in U.S. Pat. No. 3,097,967. In this known device the food products are fed to the drum by means of a conveyor belt. In the drum there are four tunnels each of which takes a portion of the products supplied. The drum is arranged such that it slopes somewhat downwards, such that the coated products can be removed via a removal belt.

Despite the fact that this known device has four tunnels in order to increase the capacity, there are nevertheless still disadvantages that can be pointed out and are associated with the width ratio of the drum, on the one hand, and the feed line and removal line, on the other hand. Specifically, said feed line and removal line must have a width that is matched to the diameter of the drum. In practice this means that the width of said belts is appreciably smaller than the diameter of the drum. The consequence of this is that a high capacity, for which relatively broad belts are needed, can be obtained only with the aid of a very large drum. This is undesirable because the associated space taken up is undesirable.

It is furthermore important that the products are transported uniformly distributed over the feed line. By this means it can be ensured that they are all evenly treated. Because the products then end up in a relatively small space there is the risk that these are broken and damage occurs, or the products can stick to one another.

A further disadvantage is that the coated food products leave the drum in the form of a relatively narrow stream, packed close to one another. In this state the food products are not immediately suitable for further processing, such as baking or frying. The consequence of this is that complex measures are needed in order to spread out the food products.

Spreading out the products is also important in connection with the further treatment thereof. Heating the products, such as in a deep fat fryer, is mentioned as an example. The products must be able to move freely in said fryer. If they were to be in contact with one another or remain stuck to one another, the uniformity of the treatment cannot be ensured.

The aim of the invention is, therefore, to provide a device of the abovementioned type that does not have these disadvantages. Said aim is achieved in that at least one further rotary drum is provided, so that the width of the feed line and the removal line is greater than the diameter of a drum and that said lines extend over at least two drums in the transverse direction.

With the device according to the invention the food products, which are supplied in a relatively broad stream on a supply line, such as one or more belts, vibrating systems and the like, are not all accommodated in one and the same drum but in two or more drums, depending on the width of the lines. The food products are therefore also subjected to the coating treatment in separate streams, which are also separate when they leave the various drums. Because of the fact that the food products are already distributed over several sub-streams, further distribution of said products over a wide removal belt can be effected much more easily.

In this context, there can be a distributor member between each drum and the removal line for distributing the food products transversely over said line. Said distributor member can comprise a conveyor belt or vibrating channel or the like per drum which is mounted close to the drum such that it can swing to and fro.

Furthermore, there can be a guide member between every two drums and the feed line for splitting the food products fed via the feed line into two streams, such as a plate, the point or edge of which is oriented contrary to the feed direction.

With the device according to the invention collection means can also be provided for collecting surplus coating material that has come from the food products emerging from the drum. Furthermore, transfer means can be provided for transferring coating material from the collection means to the food products on the feed line.

The invention will be explained in more detail below with reference to an illustrative embodiment shown in the figures.

FIG. 4 shows a plan view according to IV-IV in FIG. 1.

Figure 1:
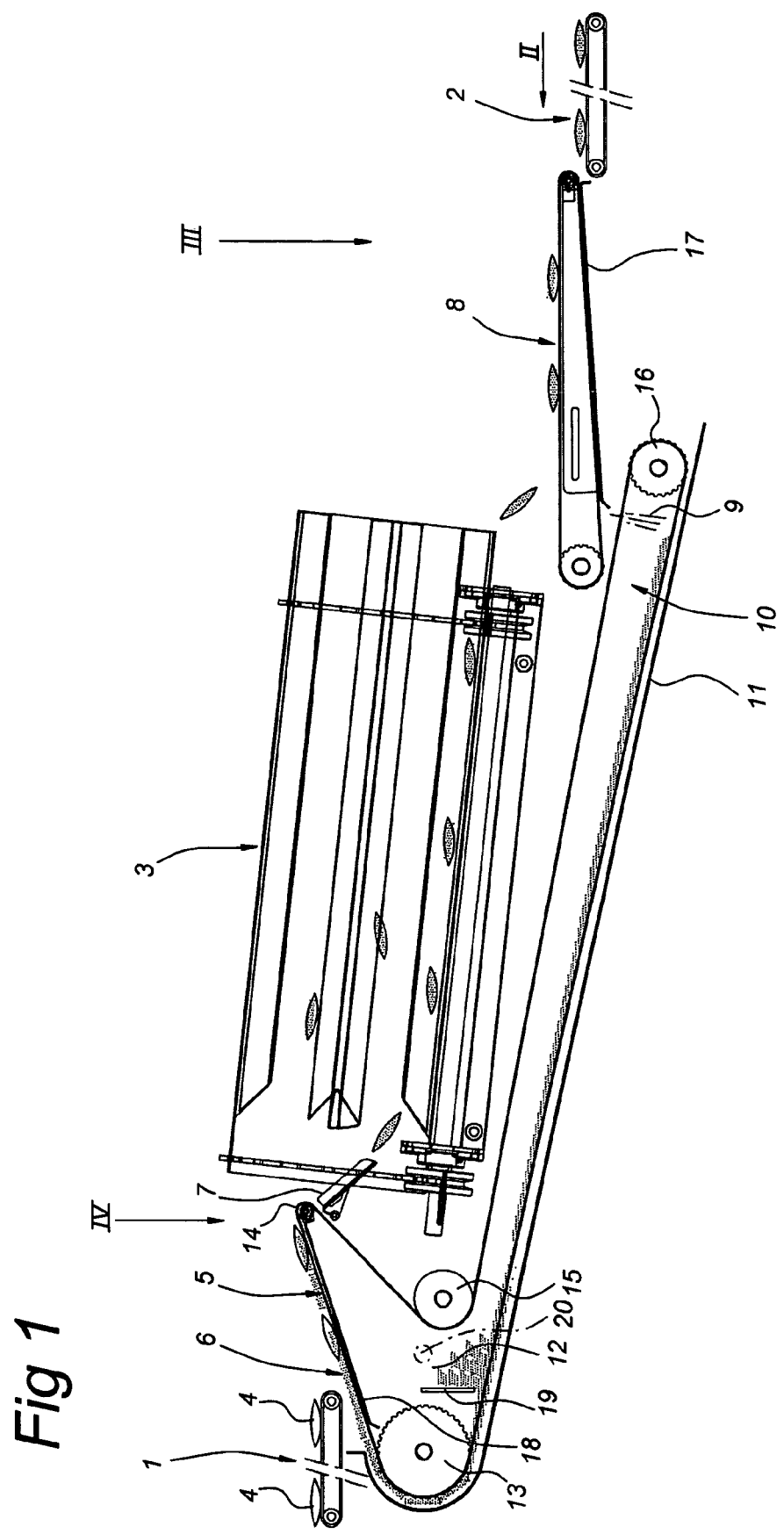
FIG. 1 shows a side view of the device according to the invention.
Figure 2:
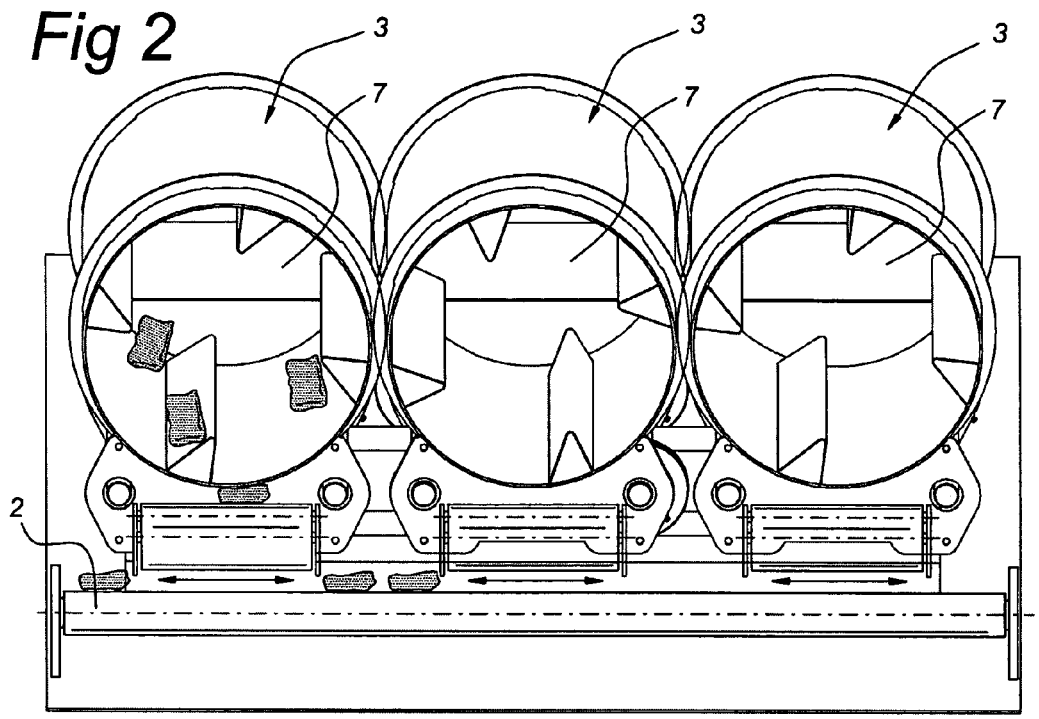
FIG. 2 shows a rear view.
Figure 3:
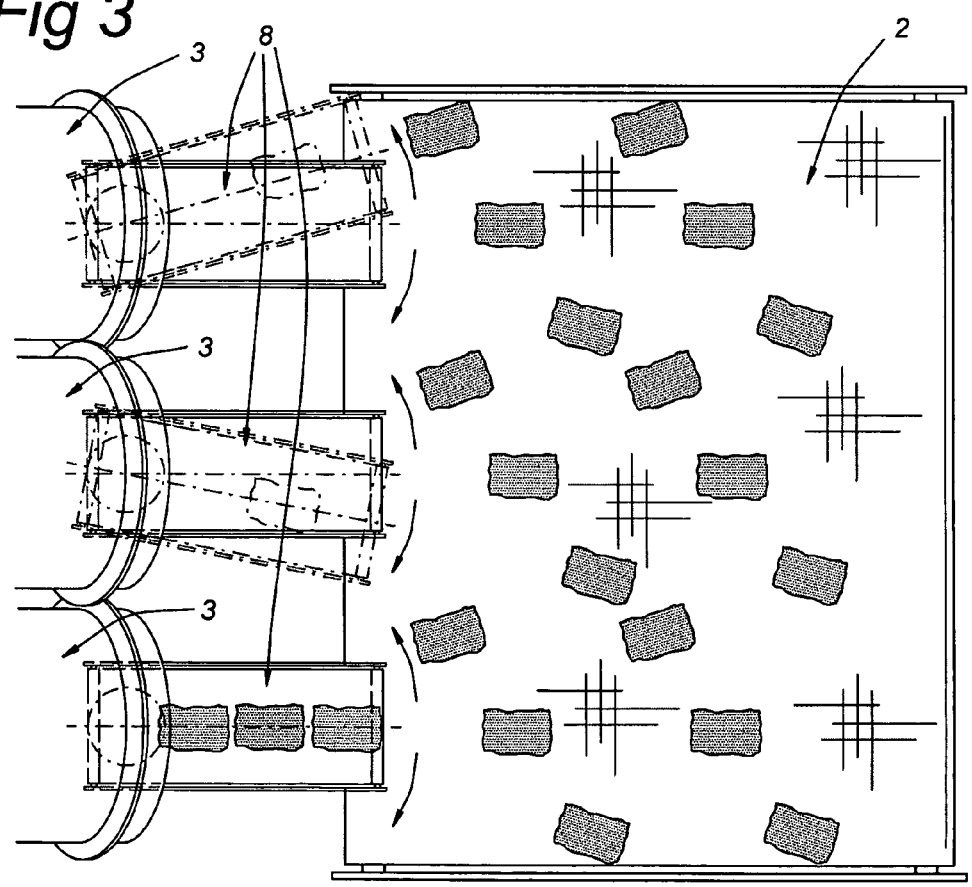
FIG. 3 shows a plan view according to III-III in FIG. 1.

The food products are fed via a feed belt, indicated in its entirety by 1, to the device shown in FIGS. 1-4 for coating food products with a particulate material, powder or the like, such as breadcrumbs, flour products, such as flour and the like. A removal belt 2 is also provided, as well as three drums 3. A conveyor belt 5 is provided at the end of the feed belt 1, by means of which the products 4 are guided into three sub-streams. These sub-streams are separated by the guide members 6 and open into the three slide channels 7.

Equal quantities of the food product 4 pass into the three drums 3 via the three slide channels 7. These drums 3 rotate about their longitudinal axis as shown in FIG. 1 and in so doing transport the food products 4 to the other end. The drums 3 can be arranged sloping slightly downwards for this purpose. The angle of inclination can be adjustable in connection with controlling the throughput speed.

At that other end a distributor member in the form of a conveyor belt 8 that can swing is provided on each drum 3. These conveyor belts 8 can swing about a vertical axis and collect the food products 4 that come from the drum 3 concerned.

The conveyor belts 8 transport the food products onto the removal belt 2 and during this operation execute a to and fro movement such that the coated food products can be removed uniformly distributed over said removal belt 2.

The conveyor belts 8 are porous, such that, as shown in FIG. 1, the granular material 9 can drop downwards from the plate 17 located below the conveyor belts 8. Beneath this there is a conveyor belt section 10, which is likewise porous and under which there is a solid plate 11. The liberated particulate material is carried along by the conveyor belt section 10 to the buffer 12, from where it is dispensed in a metered manner to the conveyor belt section 5 and the plate 18 via the return roller 13. As can be seen in FIG. 1, the products 4 to be coated end up on the particulate material 9, after which the cycle as described above is followed further.

The conveyor belt sections 10 and 5 form a single unit as shown in FIG. 1, which is made possible by the further return rollers 14, 15, 16.

Although in the illustrative embodiment described above the distributor members are constructed as conveyor belts, other embodiments, such as sliding channels, vibrating channels and the like, can also be used.

A buffer containing coating material 12 is provided close to the return roller 13, which buffer can be controlled by the distributor plate 19, the height of which is adjustable. By moving the distributor plate 19 upwards, away from the solid plate 11, a relatively large amount of coating material is fed to the conveyor belt 5. By lowering the control gate 19 this amount can be reduced, as a result of which the coating thickness of the coating material on the conveyor belt 5 is also reduced.

The amount of coating material 12 can be kept at the desired level by means of the sensor 20 and a feed device (not shown).

All lines, distributor members, and the like can consist of conveyor belts, vibrating channels, rotating discs, sliding channels, moving fingers or the like.

The invention claimed is:

1. A device for coating a food product with a particulate coating material comprising:
   a) at least one essentially horizontal, rotary drum;
   b) at least one feed line for feeding food products to be coated to a feeding end of the drum;
   c) a movable distributor member at a removal end of the drum for spreading out the food products transversely;
   d) at least one removal line for removing coated food products at said removal end of the drum; and
   e) feed means for feeding the coating material to the food products, wherein, when the drum rotates the food products, the food products are tumbled and moved from the feeding end of the drum that is oriented towards the feed line to the removal end, wherein at least one further rotary drum is provided, and wherein a width of the feed line and the removal line is greater than a diameter of at least one of said rotary drums and wherein said feed and removal lines extend over at least two drums in a transverse direction.

2. The device according to claim 1, wherein the distributor member comprises at least one endless conveyor belt, vibrating channel or the like, which is mounted close to said drums such that it can swing to and fro.

3. The device according to claim 1, wherein the distributor member comprises at least two endless conveyor belts, vibrating channels or the like, which are mounted close to said drums such that they can swing to and fro.

4. The device according to claim 1, wherein there is a guide member at the feeding end between every two drums for splitting the food products fed via the feed line into two streams.

5. The device according to claim 4, wherein the guide member is a plate that extends over the feed line.

6. The device according to claim 1, wherein the feed line and the removal line each comprise at least one endless conveyor belt, vibrating channel or the like.

7. The device according to claim 1, wherein the feed line and the removal line each comprise at least two endless conveyor belts, vibrating channels or the like.

8. The device according to claim 1, wherein collection means are provided for collecting surplus coating material that has come from the food products emerging from said drums.

9. The device according to claim 8, wherein transfer means are provided for transferring coating material from the collection means to the food products on the feed line.

10. The device according to claim 9, wherein the transfer means include a control gate for controlling the amount of coating material that is brought onto the feed line.

11. The device according to claim 10, wherein a sensor is provided for keeping the amount of coating material at the desired level.

* * * * *